Oct. 1, 1968  E. W. GOSSWILLER  3,404,371
WARNING DEVICE FOR EMERGENCY VEHICLES
Filed Jan. 19, 1967  3 Sheets-Sheet 1

Inventor
Earl W. Gosswiller
By Gary, Parker,
Juettner & Cullinan  Att'ys.

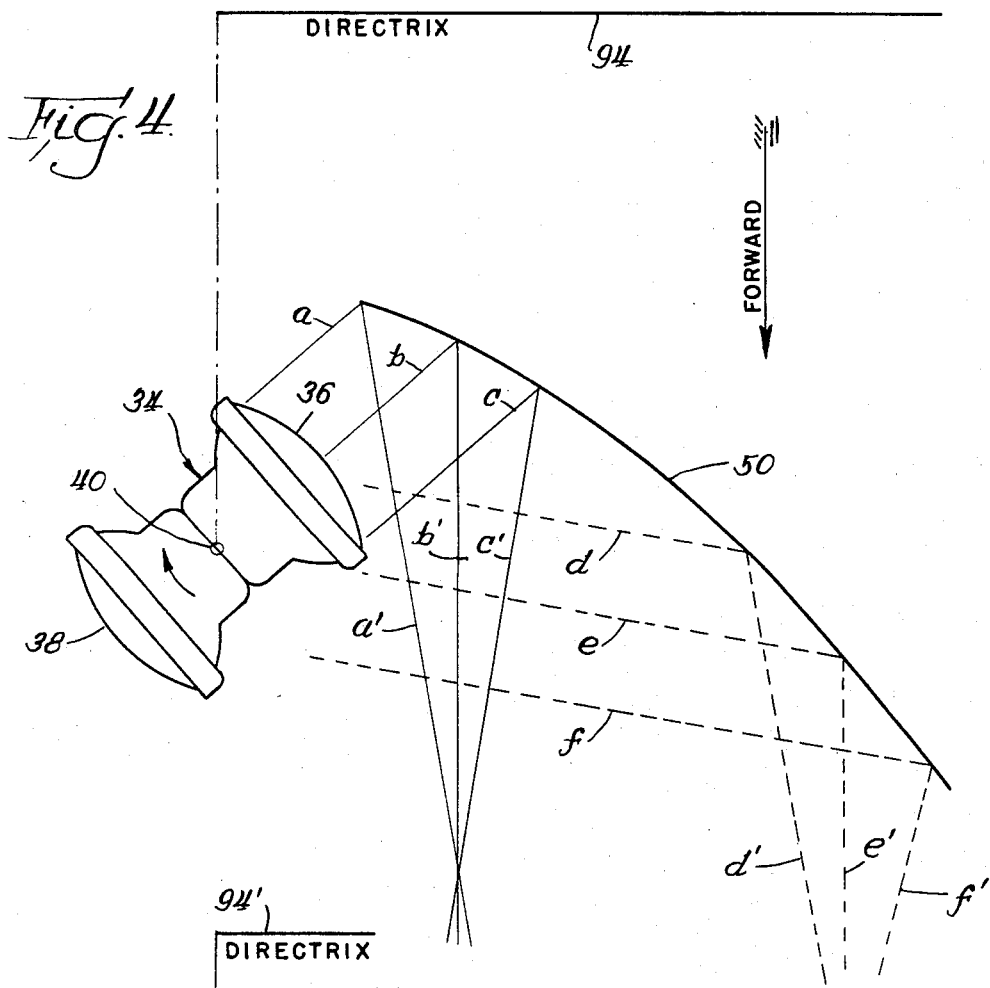
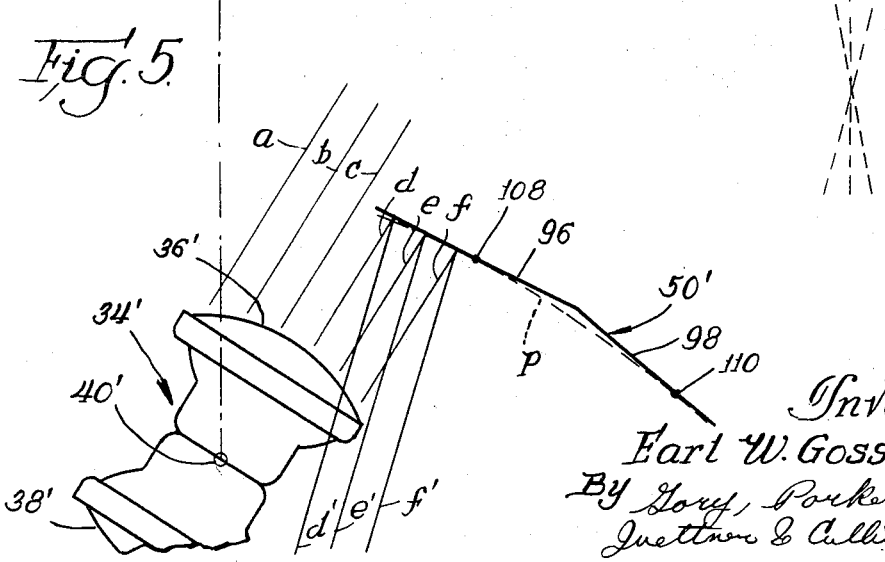

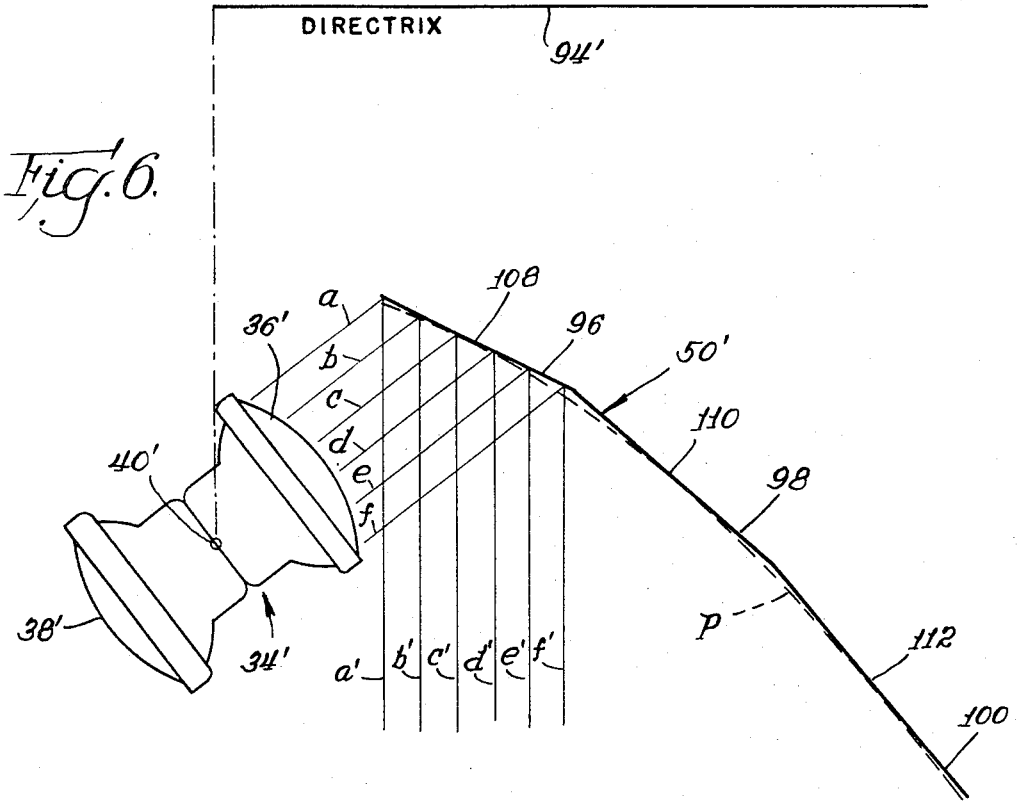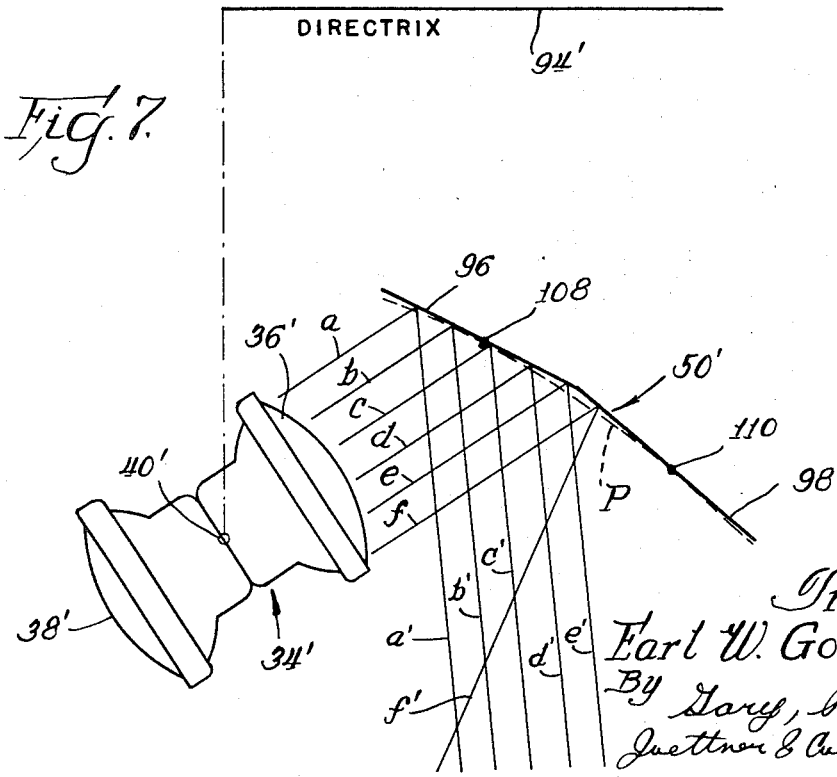

United States Patent Office 3,404,371
Patented Oct. 1, 1968

3,404,371
WARNING DEVICE FOR EMERGENCY VEHICLES
Earl W. Gosswiller, Chicago, Ill., assignor to Federal Sign and Signal Corporation, Blue Island, Ill., a corporation of New York
Filed Jan. 19, 1967, Ser. No. 610,365
17 Claims. (Cl. 340—87)

ABSTRACT OF THE DISCLOSURE

A rotating signal light of the type used on police and fire department vehicles and other emergency vehicles in combination with a mirror, preferably a generally parabolic mirror, the mirror being positioned relative to the signal light so as to deflect the light beams generally forwardly while producing a lateral shifting of such light beams as the signal light rotates.

Brief summary of the invention

It is known in the art to provide a rotating signal light for use on an emergency vehicle. Such signal lights are commonly mounted on the roof of a vehicle and are sometimes used in pairs to provide various desired lighting effects. One such application is described in my United States Patent 3,271,735 which discloses a pair of signal lights mounted in laterally spaced relation above the roof of a vehicle with one light being adjacent each side of the roof. In the latter application, the two signal lights are preferably disposed out of phase with one another so as to create the effect of a light flash on one side, then a light flash on the other side, and so on with the flashes continuously alternating from side to side. An arrangement of the foregoing type is quite effective and provides 360 degree protection of the vehicle. However, it will be recognized that when one of the lights is aimed laterally inwardly generally toward the light on the opposite side of the vehicle roof, the first-mentioned light is substantially wasted, and of course the same is true when the second light is aimed laterally inwardly generally in the direction of the first signal light.

It is therefore an object of the present invention to provide mirror means in combination with a rotating signal light for interrupting certain generally laterally directed light rays from the signal light and deflecting the same substantially forwardly or rearwardly thereby increasing the effectiveness of the signal light and utilizing light rays which would otherwise be more or less wasted.

A more specific object of the invention is to provide a signal light and mirror combination as last above-mentioned where the mirror is generally parabolic.

A further object of the invention is to provide a rotating signal light and mirror combination as described above where the mirror comprises a plurality of generally flat portions each of which is substantially tangent to a common parabolic curve.

The foregoing and other objects and advantages of the invention will be apparent from the following description thereof.

Now, in order to acquaint those skilled in the art with the manner of making and using my invention, I shall describe, in conjunction with the accompanying drawings, certain preferred embodiments of the invention.

Description of the drawings

FIGURE 4 is an enlarged diagrammatic view showing a substantially smooth parabolic mirror of the type utilized in the embodiment of FIGURE 1 and illustrating the manner in which light beams from the corresponding signal light are deflected thereby; and FIGURES 5 to 7 are enlarged diagrammatic views showing a mirror having a plurality of flat portions as utilized in the embodiment of FIGURE 3 and illustrating the manner in which light beams from the corresponding signal light are deflected thereby.

Detailed description of the invention

Figure 1:
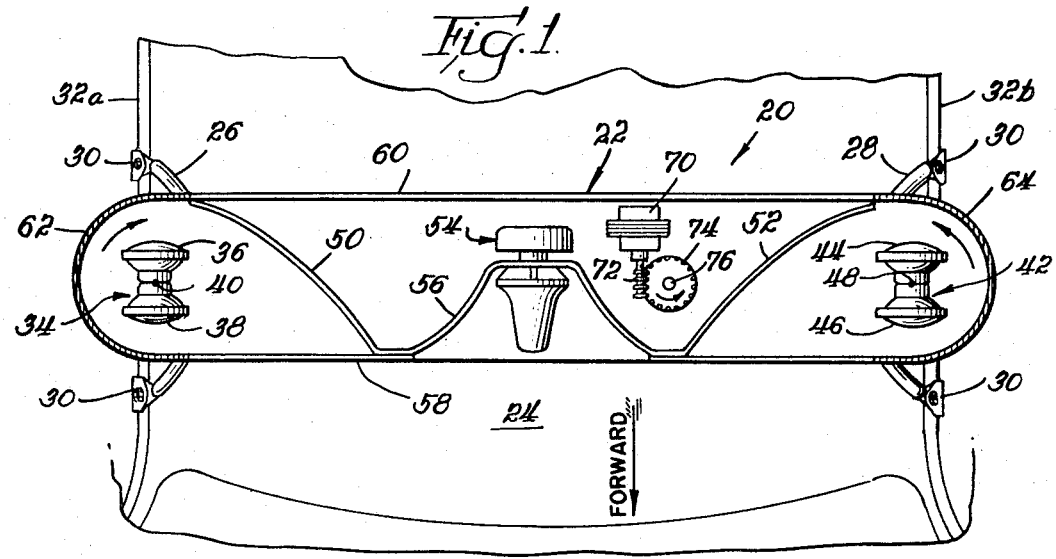
FIGURE 1 is a top plan view showing a combination of rotating signal lights and associated mirror members arranged in accordance with the present invention and mounted above the roof of an emergency vehicle, there being shown a pair of twin signal lights disposed adjacent opposite sides of the vehicle roof with a siren positioned therebetween, and a mirror positioned between each of the twin signal lights and the siren.

Referring now to the drawings, and in particular to FIGURE 1, there is shown an assembly 20 comprising a housing indicated generally at 22 which is supported above a vehicle roof 24 by a pair of arcuate bracket arms 26 and 28. Each of the arcuate bracket arms 26 and 28 is equipped with a pair of clamps as shown at 30 for securing the brackets to the vehicle rain gutters 32a and 32b which extend in conventional manner along the longitudinal side edges of the vehicle roof. A more complete description of the bracket arms 26 and 28 and the clamps 30 and the manner in which the latter are secured to the rain gutters of the vehicle roof will be found in my above-mentioned U.S. Patent 3,271,735.

It will be seen that there is disposed within the housing 22 a rotatable twin light assembly 34 comprised of a pair of oppositely disposed lamps 36 and 38, the lamps being secured to one another for conjoint rotation about a vertical axis 40. In a similar manner, there is disposed in the opposite end of the housing 22 a rotatable twin light assembly 42 comprised of a pair of oppositely disposed lamps 44 and 46 which are secured to one another for conjoint rotation about a vertical axis 48. The light assembly 34 has associated therewith a mirror 50 which is positioned approximately to one side of the light assembly inwardly of the latter, and the light assembly 42 has associated therewith a mirror 52 which is positioned approximately to one side and inwardly of the light assembly. An electronic siren or the like 54 having a speaker 56 is positioned approximately at the center of the housing 22 intermediate the two mirrors 50 and 52. The siren 54 does not constitute a part of the present invention and is shown merely to illustrate how such a component may if desired be mounted within the housing 22 together with the combination of rotating signal lights and mirrors which constitutes the present invention.

Figure 2:
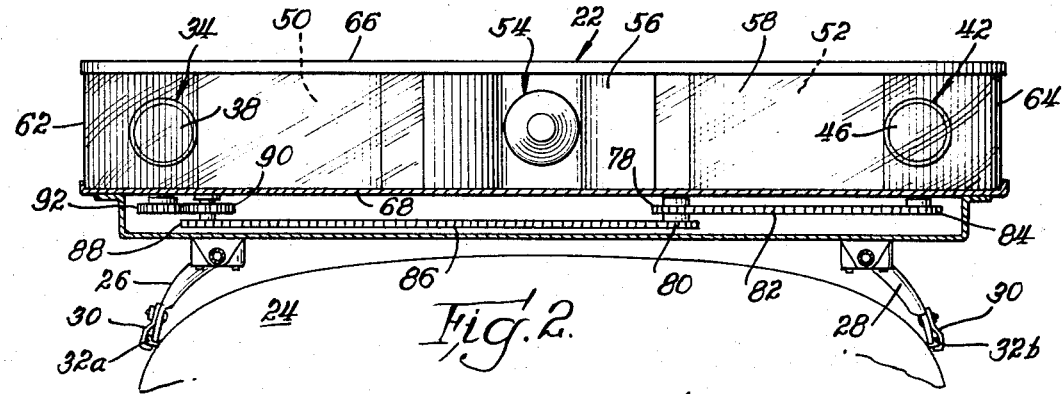
FIGURE 2 is a front elevational view of the apparatus of FIGURE 1.

As shown in the embodiment of FIGURES 1 and 2, the housing 22 comprises substantially straight front and rear walls 58 and 60 joined by a pair of generally semicircular end walls 62 and 64. There are also provided a top 66 and a bottom 68 so that the housing 22 is substantially completely enclosed to protect the components positioned therein. The front and rear walls 58 and 60 and the arcuate end walls 62 and 64 are made of plastic or other transparent material, and if desired the front and rear walls, particularly the front wall, may be made a different color from the end walls, e.g., the front wall 58 may be of a clear plastic and the end walls may be of a colored plastic, so as to provide a unique lighting effect as will be described more fully later herein.

Any suitable drive means may be provided for rotating the light assemblies 34 and 42. In the embodiment shown there is a drive motor 70 which acts through a worm 72 to drive a pinion 74 mounted on a shaft 76. The shaft 76 has a pair of sprockets 78 and 80 mounted thereon, and the sprocket 78 acts through a chain 82 and sprocket 84 to rotate the light assembly 42 in a counterclockwise direction as viewed in FIGURE 1. The sprocket 80 acts through a chain 86, sprocket 88 and reversing spur gears 90 and 92 to drive the light assembly 34 in a clockwise direction as viewed in FIGURE 1.

Accordingly, in the embodiment shown in FIGURES 1 and 2, the two light assemblies 34 and 42 are in phase with one another and are rotated in opposite directions, the assembly 34 in a clockwise direction and the assembly 42 in a counterclockwise direction as viewed in FIGURE 1, to produce a symmetrical lighting effect to be described more fully later herein. However, if desired, the assembly 34 may be rotated in a counterclockwise direction and the assembly 42 in a clockwise direction. It is also within the scope of the present invention to rotate the two light assemblies in the same direction, and if desired to orient the two assemblies out of phase with one another.

The mirrors 50 and 52 in the embodiment of FIGURE 1 comprise generally smooth parabolic mirrors positioned so that in each instance the focus point is approximately at the axis of rotation of the light assembly, i.e., the axes 40 and 48 respectively, and oriented with the directrix approximately transverse to the longitudinal axis of the vehicle, so that light rays intercepted by the mirror will be deflected approximately forwardly. FIGURE 4 illustrates the manner in which light rays from the lamp 36 are deflected generally forwardly by the parabolic mirror 50. The mirror 50 follows the path of a parabola having its focus at the axis 40 and its directrix line as shown at 94, and thus each point on the mirror is equidistant from the focus point 40 and the directrix line 94. The light source 36 is a conventional signal lamp which produces a bundle of substantially parallel light rays $a$, $b$, $c$, etc. Such light rays may in fact diverge at an angle up to approximately 4 degrees, but they approach parallelism in most instances and may be assumed to be parallel for purposes of the present discussion.

As shown in FIGURE 4, the parallel light rays $a$, $b$, $c$, etc., emanating from the lamp 36 are intercepted by the mirror 50 and deflected approximately forwardly, i.e., in a direction approximately perpendicular to the directrix line 94. More specifically, the center light ray $b$ is in alignment with the focus point 40, and thus when intercepted by the parabolic mirror 50 it is deflected along the line $b'$ which is perpendicular to the directrix 94 and thus is in a forward direction assuming the directrix is transverse to the longitudinal axis of the vehicle as in the embodiment of FIGURE 1. The light ray $a$ is parallel to the ray $b$ but impinges on a different part of the mirror which tends to rotate the ray somewhat in a counterclockwise direction, and thus the deflected ray $a'$ projects generally forwardly but somewhat inwardly relative to the deflected ray $b'$. The light ray $c$ is also parallel to the ray $b'$. The light ray $c$ is also parallel to the ray $b$ but impinges on a part of the mirror which tends to rotate the ray somewhat in a clockwise direction relative to the ray $b$, and thus the deflected ray $c'$ projects generally forwardly but somewhat outwardly relative to the deflected ray $b'$. The same effect is illustrated relative to the light rays $d$, $e$ and $f$ which of course represent a different rotary position of the rotating lamp 36. Accordingly, the parallel rays from the lamp 36 are deflected generally forwardly by the parabolic mirror 50, although they cease being parallel after being deflected by the mirror.

It is important to note that to an observer located generally forwardly of a vehicle equipped with a light assembly 20 as shown in FIGURE 1, the reflected light rays $a'$, $b'$, $c'$, $d'$, $e'$, $f'$, etc., will be seen as an inwardly moving light as the lamp 36 rotates in a clockwise direction relative to the mirror 50. Moreover, a similar effect will be created by the rotating lamp 44 and the parabolic mirror 52. Thus, as viewed from a location forwardly of the assembly 20, the two rotating lamps 36 and 44 as their light rays impinge on the mirrors 50 and 52 will produce the appearance of two forwardly directed lights, each starting from a laterally outward position and moving inwardly toward one another. Since each of the twin light assemblies 34 and 42 also includes an oppositely disposed lamp such as at 38 and 46, the same effect of two inwardly moving lights will be produced a second time during each 360 degree revolution of the light assemblies.

When the light rays from any of the four lamps 36, 38, 44 and 46 are not impinging on one of the two mirrors 50 and 52, such light rays will be visible through the transparent walls of the housing 22 so as to create the usual lighting effect produced by a conventional rotating light signal. The only portion of the light rays which are intercepted by the mirrors are those which are directed generally inwardly from each of the rotating lamps toward the other lamp, and such light rays generally contribute very little to the protection afforded by warning signal systems of the type comprising a pair of laterally spaced rotating signal lights. If desired, the housing end walls may be colored, e.g., red, blue, etc., while the front housing wall 58 is clear, so as to create the effect of a pair of rotating colored lights together with a pair of white lights which repeatedly moved from the outside inwardly toward one another.

Figure 3:
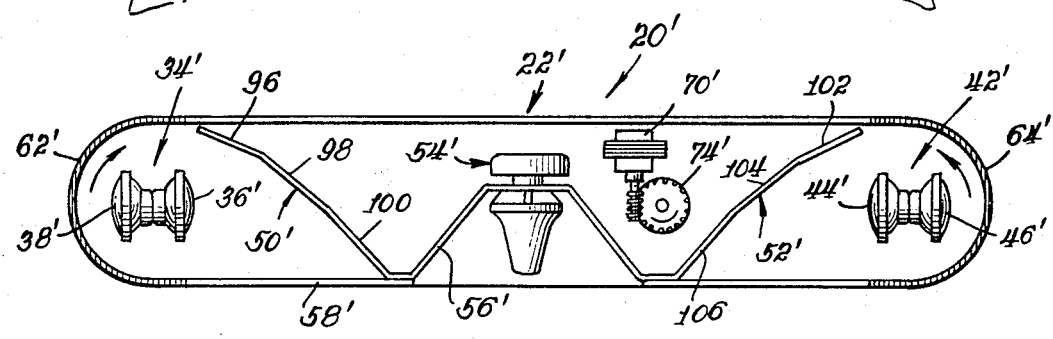
FIGURE 3 is a top plan view similar to FIGURE 1 showing an alternative form of mirror means where each mirror is comprised of a plurality of flat portions for producing distinctive laterally shifting flashes of light as the corresponding signal light rotates.

An alternative embodiment of the invention is shown in FIGURE 3 which is the same as FIGURE 1 except that mirrors 50' and 52' are provided, each of which is comprised of a plurality of flat sections. In the particular embodiment shown the mirror 50' is comprised of three flat sections 96, 98 and 100, and the mirror 52' is comprised of three flat sections 102, 104 and 106. The lighting effect produced by the mirrors 50' and 52' is different from that produced by the embodiment of FIGURE 1, since rather than a continuous inwardly moving light reflected from each mirror, there are created a series of distinct short-duration light flashes, one for each of the flat sections of the mirror. For example, as the light rays from the rotating lamp 36' impinge against the flat mirror section 96, a forwardly directd light flash is produced. As the lamp continues to rotate and its light rays impinge against the mirror section 98, a second forwardly directed light flash is produced, and again a third flash is produced as the rays impinge again the mirror section 100. The result is thus three distinct short-duration forwardly directed light flashes produced in extremely rapid sequence and moving from the outside inwardly, such result occurring each time the lamp 36' rotates past the mirror 50'.

The foregoing effect will of course be produced twice during each 360 degree rotation of the light assembly 34' if the oppositely disposed lamp 38' is utilized in back-to-back relation with the lamp 36'. Moreover, it will be understood that a similar effect will be produced by the lamps 44' and 46' acting on the mirror sections 102, 104 and 106. Consequently, when two mirrors are arranged as shown in FIGURE 3, each mirror will repeatedly produce a series of three distinct light flashes in rapid sequence, and the flashes will move from the outside inwardly. For example, simultaneous flashes will be produced from the mirror sections 96 and 102, then from the mirror sections 98 and 104, then from the mirror sections 100 and 106, and so on. If desired, the lamp assemblies 34' and 42' may be oriented out of phase with one another, or they may be rotated in the same direction. However, a highly effective symmetrical effect as described above is produced when the two lamp assemblies are oriented in phase with one another and rotated in opposite directions.

FIGURES 5, 6 and 7 illustrate the manner in which the light rays are reflected by the flat mirror sections 96, 98 and 100 of the mirror 50'. It should first be understood that the mirror 50' is essentially a parabolic mirror in the sense that each of the flat sections is tangent to a common parabolic curve. For example, FIGURE 6 shows a parabolic curve P, the focus point being located at 40' and the directrix line at 94', so that each point on the curve P is equidistant from the point 40' and the line 94'. The flat mirror section 96 is tangent to the curve P at its center point 108, the flat section 98 is tangent to the curve P at its center point 110, and the flat section 100 is tangent to the curve P at its center point 112. Accordingly, while the mirror 50' is obviously not a true parabolic curve, it comprises a plurality of flat sections each of which is tangent to a common parabolic curve.

As the light rays from the lamp 36' first reach the flat mirror section 96 as shown in FIGURE 5, such rays are deflected generally forwardly but in a somewhat outward direction as shown by the reflected rays *d'*, *e'* and *f'*. As the lamp 36' continues to rotate to a centered position relative to the flat mirror section 96 so that the entire group of substantially parallel light rays therefrom impinge against the mirror section 96 as shown in FIGURE 6, the parallel rays are deflected forwardly so as to remain substantially parallel to one another. It will be understood from FIGURE 6 that a central light ray emanating from the focus point 40' and impinging the flat mirror section 96 at the midpoint 108 thereof will be directed forwardly perpendicular to the directrix line 94', since the section 96 is tangent to the true parabola at point 108, and it will further be understood that all other rays parallel to the central ray which impinge against the same flat mirror section 96 will likewise be deflected in a forward direction. As the lamp 36' continues to rotate so that a central ray emanating from the focus 40' is to the right of the point 108 as shown in FIGURE 7, such a ray will be rotated somewhat in a counterclockwise direction, as will all of the other light rays parallel thereto which engage the same flat mirror surface 96. Accordingly, the rays *a*, *b*, *c*, *d* and *e* will be deflected forwardly and somewhat inwardly as shown at *a'*, *b'*, *c'*, *d'* and *e'*.

It will be seen from the foregoing that the flat mirror section 96 produces a sweep or spread effect as it first deflects the rays forwardly but slightly outwardly as shown in FIGURE 5, then directly forwardly as shown in FIGURE 6, and finally forwardly and somewhat inwardly as shown in FIGURE 7. Each of the other flat mirror sections 98 and 100 will provide the same effect so as to produce movement of the rays or sweeping thereof from the outside inwardly. The foregoing effect is produced by each of the flat mirror sections 96, 98 and 100 independently of the other as the light rays impinge thereagainst. However, it is important to understand that the more dominant effect will be that of three distinct short-duration high intensity light flashes directed generally forwardly as the light rays first impinge against the mirror section 96, then against the mirror section 98, and finally against the mirror section 100.

Terms such as "generally parabolic" or "substantially parabolic" as used herein and in the appended claims are intended to include both the smooth parabolic type mirrors as shown in the embodiment of FIGURE 1, and the mirrors comprising a plurality of flat sections each substantially tangent to a parabolic curve as shown in FIGURE 3. With respect to the latter, it is preferable that the flat sections increase in length as the angle defined by the light rays and the flat sections decreases. In other words, the length of the flat mirror section 96 in FIGURE 3 is determined so as to be able to accommodate all of the light rays from the lamp 36' as shown in FIGURE 6, and in order to accomplish the same objective with respect to the flat mirror sections 98 and 100 the latter should be progressively greater in length.

The combination of rotating signal lights and associated mirrors in accordance with the present invention provides unique lighting effects not produced by the warning light systems heretofore known such as rotating signal lights used alone or in combination with one another. In each instance the rotating signal light assemblies 34 and 42 or 34' and 42' provide the appearance of a conventional rotating signal light when the light rays are not being intercepted by the associated mirror. However, when such rays impinge against a corresponding mirror then the rays are deflected generally forwardly, and the light rays reflected by the mirrors shift in a lateral or sideways direction, e.g. from the outside inwardly in the particular embodiment described.

The mirrors of the present invention are generally parabolic type mirrors, one preferably positioned approximately to the inward side of each of the two rotating light assemblies. Preferably each mirror is oriented so that the focus point of the mirror is the approximate center of the corresponding light source, e.g. the axis of rotation of the rotating twin light assembly, and in addition each mirror is preferably oriented so the directrix line is transverse to the longitudinal axis of the vehicle, whereby the light rays will be deflected substantially forwardly. Where a smooth parabolic mirror is utilized, the reflected light is a continuous laterally shifting flash during the time the light rays are impinging on the mirror. On the other hand, when the mirror is comprised of a plurality of flat sections, there are produced a series of short duration high intensity light flashes which shift laterally as the lamp rotates past the mirror. As previously pointed out, a highly desirable symmetrical effect can be achieved if the two rotating light assemblies are in phase with one another and are rotated at equal speeds in opposite directions. As was also pointed out earlier herein, the reflected light may contrast in color with the light which does not impinge the mirrors by using contrasting colors in fabricating the front wall 58 of the housing and the housing end walls 62 and 64.

Moreover, with the arrangements described herein including a pair of rotating light assemblies and a pair of mirrors in combination therewith, light rays are emanated from all sides of the vehicle to provide substantially 360 degree protection, and the light intercepted by the mirrors comprises light which would otherwise be wasted since it is directed inwardly from one light assembly generally toward the other. It will be noted that the mirrors are preferably located so as not to prevent the rotating light assemblies from projecting light rays in a rearward direction, although if desired additional rotary or stationary signal lights can be provided to increase the amount of rearwardly directed light.

While I have described my invention in certain preferred forms, I do not intend to be limited to such forms, except insofar as the appended claims are so limited, since modifications coming within the scope of my invention will readily occur to those skilled in the art, particularly with my disclosure before them.

I claim:

1. Warning signal apparatus for mounting on the roof of an emergency vehicle comprising, in combination, signal light means rotatable about a generally vertical axis, and generally parabolic mirror means located approximately to one side of said signal light means, said mirror means being oriented with its directrix approximately transverse relative to a longitudinal axis of said vehicle so as to intercept light rays from said rotatable signal light means and deflect the same approximately in a forward direction relative to said vehicle.

2. The invention of claim 1 wherein said generally parabolic mirror means is positioned so that its focus point is located approximately at said vertical axis of said rotatable signal light means.

3. The invention of claim 1 where said mirror means comprises a substantially smooth parabolic mirror.

4. The invention of claim 1 where said mirror means comprises a plurality of substantially flat mirror sections each of which is approximately tangent to a parabolic curve.

5. The invention of claim 4 where said flat mirror sections progressively increases in length from one end of said mirror means to the other end thereof.

6. The invention of claim 1 where said rotatable signal light means is of a type which produces a plurality of approximately parallel light rays.

7. The invention of claim 1 where said rotatable signal light means comprises a pair of oppositely disposed lamps mounted back-to-back for conjoint rotation about a common vertical axis.

8. Warning signal apparatus for mounting on the roof of an emergency vehicle comprising, in combination, signal light means mounted for rotation about a generally vertical axis, said signal light means being of a type which produces a plurality of approximately parallel light rays, and generally parabolic mirror means located approximately to one side of said signal light means, said mirror means being oriented with its directrix approximately transverse relative to a longitudinal axis of said vehicle and positioned so that its focus point is located approximately at said vertical axis so as to intercept light rays from said signal light means and deflect the same approximately in a forward direction relative to said vehicle, and said mirror means comprising a plurality of substantially flat mirror sections each of which is approximately tangent to a parabolic curve, said flat mirror sections progressively increasing in length from the rear end of said mirror means to the forward end thereof.

9. Warning signal apparatus for mounting on the roof of an emergency vehicle comprising, in combination, a pair of signal light means rotatable about respective generally vertical axes and laterally spaced from one another so as to be disposed above opposite sides of said vehicle roof, and a pair of generally parabolic mirror means, one associated with each of said signal light means, said pair of mirror means being disposed intermediate said pair of signal light means with each mirror means positioned generally inwardly of a corresponding signal light means, and each of said mirror means being oriented with its directrix approximately transverse relative to a longitudinal axis of said vehicle so as to intercept light rays from the corresponding signal light means and deflect said rays approximately in a forward direction relative to said vehicle.

10. The invention of claim 9 where each of said generally parabolic mirror means is positioned so that its focus point is located approximately at said vertical axis for the corresponding rotatable signal light means.

11. The invention of claim 9 where each of said mirror means comprises a substantially smooth parabolic mirror.

12. The invention of claim 9 where each of said mirror means comprises a plurality of substantially flat mirror sections each of which is approximately tangent to a parabolic curve.

13. The invention of claim 12 where said flat mirror sections progressively increase in length from the rear end of said mirror means to the forward end thereof.

14. The invention of claim 9 where each of said pair of rotatable signal light means is in phase with one another, and means for rotating said pair of signal light means in opposite directions.

15. The invention of claim 9 where said pair of signal light means and said pair of parabolic mirror means are mounted in a common housing having a transparent front wall and a pair of transparent end walls, said end walls being a different color from said front wall to provide a color contrast between light projected directly through said end walls and light deflected forwardly through said front wall by said mirror means.

16. Warning signal apparatus for mounting on the roof of an emergency vehicle comprising, in combination, a pair of signal light means rotatable about respective generally vertical axes and laterally spaced from one another so as to be disposed above opposite sides of said vehicle roof, a pair of generally parabolic mirror means, one associated with each of said signal light means, said pair of mirror means being disposed intermediate said pair of signal light means with each mirror means positioned generally inwardly of a corresponding signal light means, and each of said mirror means being oriented with its directrix approximately transverse relative to a longitudinal axis of said vehicle and positioned so that its focus point is located approximately at said vertical axis of rotation of the corresponding signal light means, each of said mirror means comprising a plurality of substantially flat mirror sections each of which is approximately tangent to a parabolic curve, and said flat mirror sections progressively increasing in length from the rear end of said mirror means to the forward end thereof.

17. The invention of claim 16 where each of said pair of rotatable signal light means is in phase with one another, and means for rotating said pair of signal light means in opposite directions.

References Cited

UNITED STATES PATENTS

| | | | |
|---|---|---|---|
| 2,118,709 | 5/1938 | Lebby | 340—50 |
| 3,271,735 | 9/1966 | Gosswiller | 340—50 |

EUGENE G. BOTZ, *Primary Examiner.*